United States Patent
Mestha et al.

(10) Patent No.: US 8,358,453 B2
(45) Date of Patent: Jan. 22, 2013

(54) CONTROL BASED ITERATIVE PROFILING METHODS

(75) Inventors: Lalit Keshav Mestha, Fairport, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 934 days.

(21) Appl. No.: 12/428,799

(22) Filed: Apr. 23, 2009

(65) Prior Publication Data
US 2009/0296171 A1    Dec. 3, 2009

Related U.S. Application Data

(60) Provisional application No. 61/056,262, filed on May 27, 2008.

(51) Int. Cl.
G03F 3/08 (2006.01)
H04N 1/46 (2006.01)
G06K 9/00 (2006.01)
H04N 1/60 (2006.01)

(52) U.S. Cl. ......... 358/518; 358/1.9; 358/535; 382/167; 382/165

(58) Field of Classification Search ............ 358/1.9, 358/518, 517, 515, 535, 526, 533, 510; 382/167, 382/162, 164, 165
See application file for complete search history.

(56) References Cited

U.S. PATENT DOCUMENTS

| | | | | |
|---|---|---|---|---|
| 5,818,960 A * | 10/1998 | Gregory et al. | ......... | 382/167 |
| 5,878,195 A * | 3/1999 | Mahy | ......... | 358/1.9 |
| 6,356,363 B1 * | 3/2002 | Cooper et al. | ......... | 358/1.9 |
| 6,654,143 B1 * | 11/2003 | Dalal et al. | ......... | 358/1.9 |
| 7,768,672 B2 * | 8/2010 | Gil et al. | ......... | 358/1.9 |
| 7,990,592 B2 * | 8/2011 | Mestha et al. | ......... | 358/534 |
| 8,018,623 B2 * | 9/2011 | Couwenhoven et al. | .... | 358/3.06 |
| 2004/0071363 A1 * | 4/2004 | Kouri et al. | ......... | 382/276 |
| 2004/0109180 A1 * | 6/2004 | Braun et al. | ......... | 358/1.9 |
| 2005/0128495 A1 * | 6/2005 | Arai | ......... | 358/1.9 |
| 2008/0043264 A1 | 2/2008 | Gil et al. | | |
| 2008/0043271 A1 * | 2/2008 | Gil et al. | ......... | 358/1.9 |
| 2008/0252931 A1 | 10/2008 | Mestha et al. | | |
| 2008/0259374 A1 | 10/2008 | Mestha et al. | | |
| 2009/0080041 A1 | 3/2009 | Fan et al. | | |
| 2009/0296113 A1 * | 12/2009 | Mestha et al. | ......... | 358/1.9 |

* cited by examiner

*Primary Examiner* — Madelein A Nguyen

(74) *Attorney, Agent, or Firm* — Fay Sharpe LLP

(57) ABSTRACT

A method and system of color management for an image marking device. A sensor measures printed hardcopy colors. A first gain, computed by a linear controller based on a linear model, is scheduled for each color node of a sampled color space. For each node where a convergence error exceeds a threshold, a second gain is scheduled by a nonlinear controller. The second gain scheduling includes initializing operational parameters, and performing an iterative procedure. The iterative procedure includes computing gain matrices over a defined projection horizon, evaluating a cost function for each gain matrix, determining the cost function, scheduling a new gain based on selecting a gain matrix having the minimum value of the cost function, and computing new CMYK values based on the new gain. A multidimensional LUT based on the scheduled gain matrices is generated and stored in memory, and a hardcopy output image is generated based on the stored multidimensional LUT.

20 Claims, 14 Drawing Sheets

CONTROL BASED ITERATIVE PROFILING METHODS

This application claims benefit of U.S. Provisional Application No. 61/056,262, filed on May 27, 2008, titled CONTROL BASED ITERATIVE PROFILING METHODS.

BACKGROUND

This disclosure relates generally to methods and systems for color management in image/text printing or display systems, and more particularly to control based iterative profiling methods and systems for improving color rendering performance of nonlinear print engines.

Printer destination profiles are used to find device values that produce a specified color. The profiles are generally three-dimensional colorimetric-to-device lookup tables. One method of building a lookup table is to iteratively find print device values for each node in the table until the device value that produces the desired color is found. Iterations can be carried out either on the printer model or directly on the printer using a single multi-input-multi-output (MIMO) gain matrix and an integrator. This approach assumes that the print engine is linear for each node color. However, some print engines such as, e.g., solid ink printers, xerographic printers, etc., suffer from the fact that the process is nonlinear. This nonlinearity is particularly pronounced in the darker regions of their reproducible color gamut. As a result, the linear controller does not converge well, leading to contours or accuracy loss in the output images.

Consequently, it would be desirable to have a method and system for improved profiling of print systems having a nonlinear response, as well as for print systems having a linear response.

INCORPORATION BY REFERENCE

The following references are incorporated herein by reference, in their entirety.

U.S. Pub. No. 2008/0043264, entitled SPOT COLOR CONTROLS AND METHOD, by A. Gil et al., discloses a method of color management for image marking devices utilizing an automated spot color editor having a control module accessing a graphical user interface U.S. patent application Ser. No. 11/961,367, filed, Dec. 20, 2007, entitled "OPTIMAL NODE PLACEMENT FOR MULTI-DIMENSIONAL PROFILE LUTS FOR ARBITRARY MEDIA AND HALFTONES USING PARAMETERIZED MINIMIZATION" by Schweid et al.; and U.S. patent application Ser. No. 12/127,728, filed, May 27, 2008, entitled "PRINTER PROFILING METHODS, APPARATUS AND SYSTEMS FOR DETERMINING DEVICE AND GAIN MATRIX VALUES" by Maltz et al.

BRIEF DESCRIPTION

There is provided, a method of color management for an image marking device, e.g., a printer. The method includes scheduling a first gain for each color node of a sampled color space based on a model of the image marking device. For each node where a convergence error exceeds a threshold, a second gain is scheduled. The second gain scheduling includes initializing operational parameters, and performing an iterative procedure. The iterative procedure includes, for each iteration, computing gain matrices over a defined projection horizon, evaluating a cost function for each gain matrix, scheduling a new gain based on selecting a gain matrix resulting in a minimum value of the cost function, and computing new CMYK values based on the new gain. A multidimensional LUT based on the scheduled gain matrices is stored in memory, and a hardcopy output image is generated based on the stored multidimensional LUT.

There is also provided, a system of color management for an image marking device. The system includes a receiving unit for receiving image data input for a marking job, wherein the image data input may be in either a device-dependent or a device-independent color space. A memory is included for storing a multidimensional LUT, and an included gain scheduling controller includes a linear controller and a nonlinear controller, wherein the gain scheduling controller is configured to perform a method of color management. The method of color management includes scheduling a first gain for each color node of a sampled color space, where each gain is computed based on a model of the image marking device. For each node where a convergence error exceeds a threshold, a second gain is scheduled. The second gain scheduling includes initializing operational parameters, and performing an iterative procedure. The iterative procedure includes, for each iteration, computing gain matrices over a defined projection horizon, evaluating a cost function for each gain matrix, scheduling a new gain based on selecting a gain matrix resulting in a minimum value of the cost function, and computing new CMYK values based on the new gain. A multidimensional LUT based on the scheduled gain matrices is stored in memory, and a hardcopy output image is generated based on the stored multidimensional LUT.

Further provided is a computer-readable storage medium having computer readable program code embodied therein. When the program code is executed by a computer, it causes the computer to perform the above-described method for color management of an image marking device.

DETAILED DESCRIPTION

Although concepts of the present application are described in terms of an L*a*b* colorimetric space and a CMYK device color space, the present application is not limited in this regard, and the concepts described herein are applicable as well to other color spaces known in the art such as, e.g., CIEXYZ. Three-dimensional colorimetric-to-device lookup tables are generally of the order of $33^3$ nodes, or smaller, and interpolation is used for finding device values for input colors not on the nodes of the lookup tables. These tables can be used for processing large images, e.g., images with pixels numbering in the tens of millions.

One way of building the table is to iteratively print device values for each node in the table until the values that produce the desired color are found. An automated spot color editor (ASCE) process can be used to facilitate a rapid convergence of this search process. One such ASCE process is described in U.S. Pub. No. 2008/0043264 entitled SPOT COLOR CONTROLS AND METHOD. For purposes of explanation, spot colors may be defined as a fixed set of colors which may be Pantone® colors, logo colors, colors in proprietary marked patterns, or user-defined colors. Spot colors may be used for large background areas, which may be the most color critical portion of a particular page.

Figure 1:
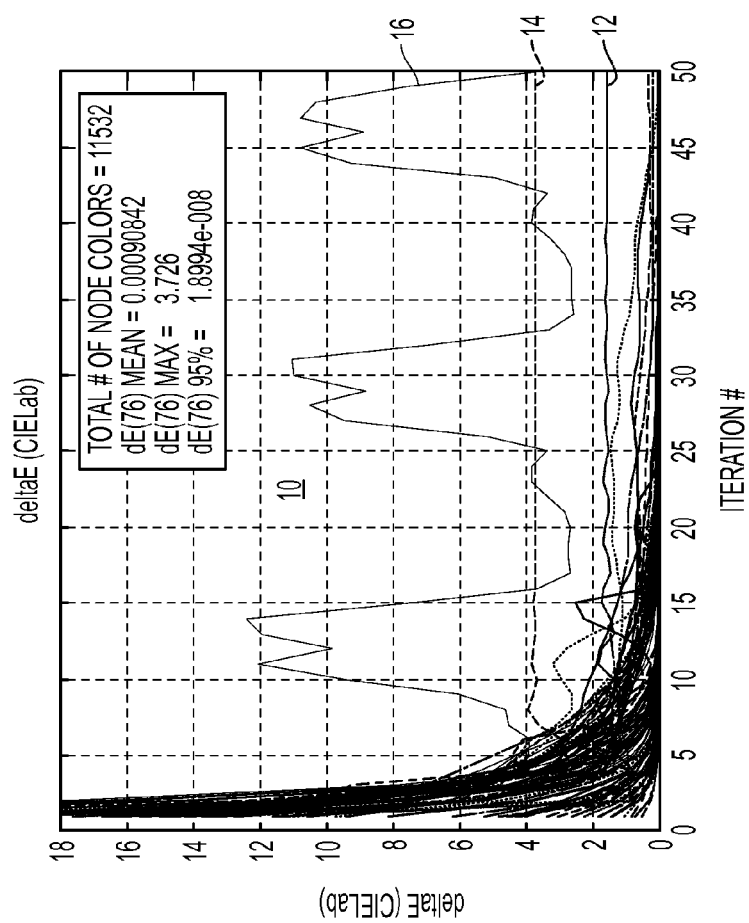
FIG. 1 is a convergence plot for a solid ink printer based on prior art iterations.

With reference to FIG. 1, an exemplary convergence plot 10 is shown for a solid ink printer when ASCE iterations are used. A $33^3$ multidimensional LUT contains 11,532 colors inside the gamut. An iterative control algorithm searches for the CMYK values for each node until the node colors converge to the desired L*a*b* values. These values are then used in completing an International Color Consortium (ICC) profile. Three node colors 12, 14, 16 shown in the Figure are listed in Table 1 and show deltaE2000 (deltaE2K) error values greater than 0.5. If these error values are not improved, then errors in the look up table can occur which may lead to contours in the output images.

TABLE 1

| L* | a* | b* | deltaE2K |
|---|---|---|---|
| 20.9285 | −8.1469 | 9.6285 | 1.5587 |
| 18.6336 | 0.8994 | −10.4874 | 3.3966 |
| 18.6534 | −0.3788 | 5.7240 | 3.7260 |

The algorithm proposed in this application uses some aspects of the previously discussed spot color algorithm proposed in U.S. Pub. No. 2008/0043264. The spot color algorithm proposed therein, however, does not describe coverage for creating multi-dimensional profile LUTs, nor does it describe scheduling the controller's gain for colors located in the nonlinear regions. Aspects of the present application, however, extend the coverage for creating multi-dimensional profile LUTs, and for scheduling the controller's gain for colors located in the nonlinear regions. Still further, embodiments described herein utilize a different way of computing new CMYK recipes during the look-ahead process, and, based on using the MIMO Model-Predictive Control (MPC) based algorithm for colors with convergence problems, gain matrices are scheduled differently during the iteration process. The gain matrix computed by the Model-Predictive Control implementation is selected out of multiple gain matrices during convergence.

During the iterative convergence process, the algorithm implementation selects a multiplicity of gain matrices (in this case appropriate gain matrices due to the MPC algorithm) for each node color. In other words, each node color will have a multiplicity of gain matrices. The correct gain matrix is chosen while creating the profiles. Using notation similar to that used in U.S. Pub. No. 2008/0043264, a method of selecting a best plan is described. In the description below, k denotes the iteration number, and $y(k+1)=[L^*_{k+1} a^*_{k+1} b^*_{k+1}] \in \Re^3$ are the outputs (L*a*b* measurements at iteration step k+1) obtained by a sensor, where $x(k) \in \Re^4$ are the states (e.g., any combination of colors taken from CMYK space), and u(k) is the control input.

Where $[L^*_r, a^*_r, b^*_r]$ represents the reference values at step k, the tracking error is defined as $e(k+j)=([L^*_r, a^*_r, b^*_r]-y(k+j))$. The sequence of control inputs of the $i^{th}$ plan of iteration length N are represented by $u^i[k,N]=u^i(k,0), u^i(k,1), u^i(k,2), \ldots, u^i(k,N-1)$. Each plan i is formed by a set of control inputs generated by a state-feedback controller computed for a specific pair, conformed by the printer Jacobian and the pole locations. The printer Jacobian is computed based on a stored printer model. Pole locations are assigned during iteration.

To exemplify how the control input $u^i[k,N]$ of plan i affects a system, the behavior of the system states is projected at time k for $j=0, 1, \ldots, N-1$. More specifically, $$x_m^i(k, j+1) = I^* x_m^i(k,j) + K^i(k) e^i(k,j) \tag{1}$$

where $x_m^i(k,j)$ is the $j^{th}$ set of estimated state values of plan i at time k, $I \in \Re^4$ is the identity matrix, $K^i(k)$ is the $i^{th}$ gain matrix used for the entire current projection, and $e^i(k,j)$ is the $j^{th}$ estimated tracking error of plan i at time k. It is to be noted here that $x_m^i(k,j)$, are the CMYK estimated values whereas $y_m^i(k,j)$ are the estimated L*a*b* values from the model.

To evaluate the performance of each plan i, the cost function is defined as $$J(u^i[k,N]) = w_1 \sum_{j=0}^{N-1}(E^i(k+j))^2 + w_2 \sum_{j=0}^{N-1}\|u^i(k,j)\|^2 \tag{2}$$

where $E^i(k+j)=deltaE2K(L^*_r, a^*_r, b^*_r, y_m^i(k+j))$, $u^i(k,j)=K^i(k)*([L^*_{r,k+j} a^*_{r,k+j} b^*_{r,k+j}]-y_m^i(k+j))$, $\|a\|$ is the 2-norm of vector a, and deltaE2K is the color difference formula defined by the International Commission on Illumination (CIE). The variables $w_1$ and $w_2$ are positive constants that scale both the color-difference formula and the control energy so that those constants could be used to put more emphasis on (i) the color difference, (ii) the control energy of the actuators used to track the color difference, or (iii) achieving a balance between (i) and (ii).

To select the best plan, $$i^* = arg_i \min J(u^i[k,N]) \tag{3}$$

is computed at each time k.

As previously described, embodiments described herein choose the best gain matrix while creating the profiles. This is related to how the MPC implementation selects the CMYK values for the next iteration k+1, $x(k+1)=x_m^{i*}(k, j^*)$, where $j^*=arg_j \min E^{i*}(k+j)$ is only the index of the minimum deltaE2K value created during all the projections executed at iteration k by plan i*. This facilitates improvement of the controller's convergence speed.

Figure 2:
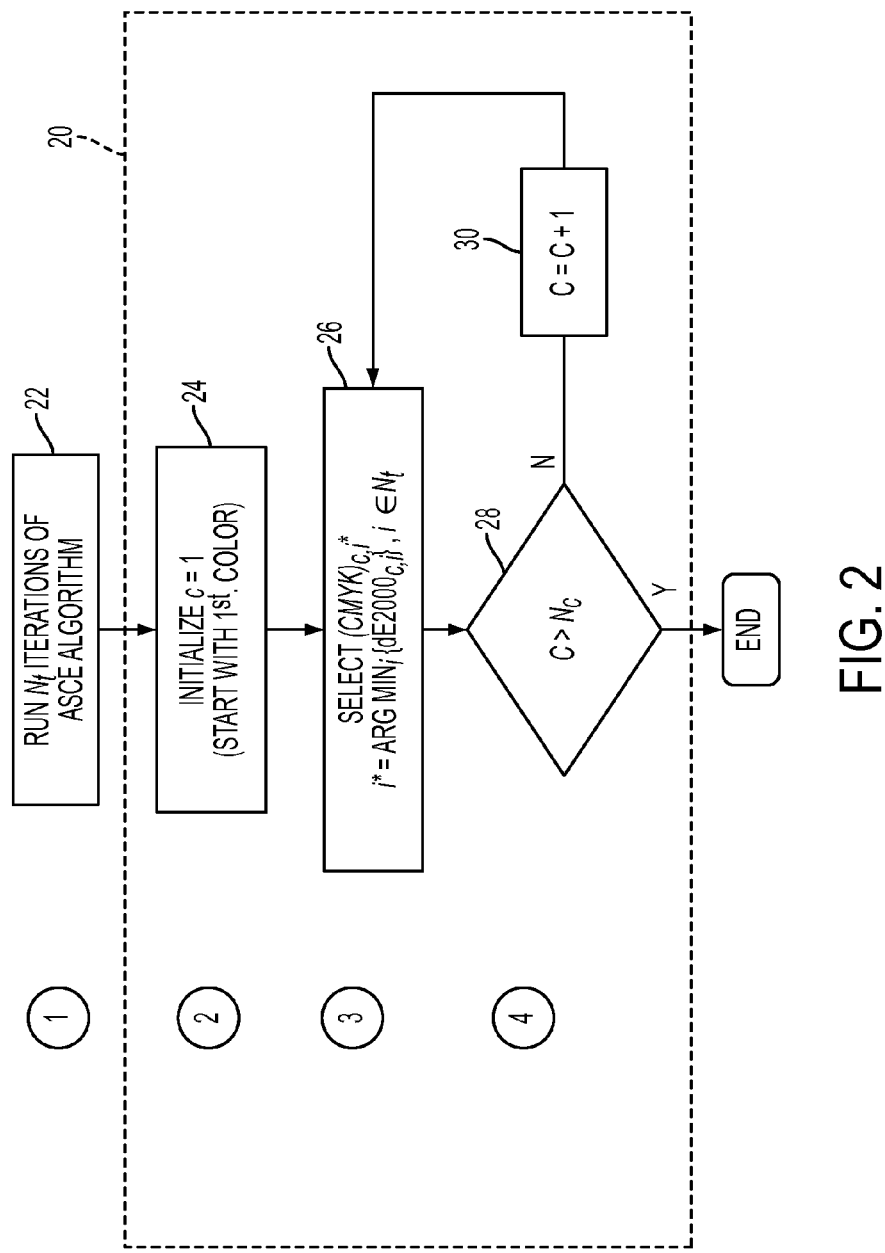
FIG. 2 is a flow diagram for determining a best CMYK value according to concepts of the present application.
Figure 3:
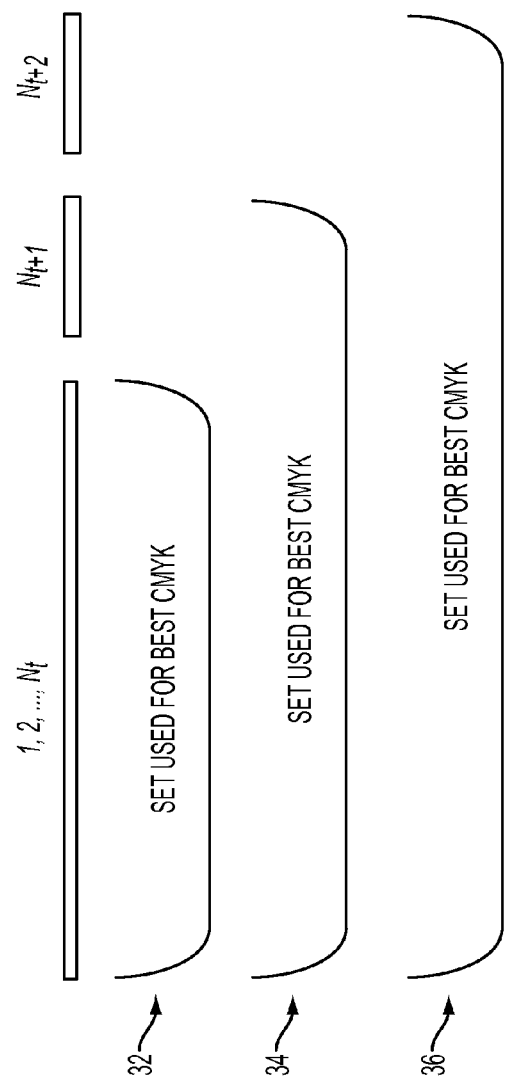
FIG. 3 shows schematically the set of CMYK values used to select the best CMYK as shown in FIG. 2.

With reference to FIG. 2, a flow diagram 20 is shown for determining a best CMYK value. In a given run, let it be assumed that $N_c$ colors are to be adjusted by the algorithm, which will iterate $N_t$ times. In the first block 22, an application (e.g., the above-described ASCE algorithm) is executed for $N_c$ colors ($N_t$ iterations per color). The best CMYK value selection algorithm begins from the second block 24 where the algorithm picks the first color for the analysis. The third block 26 seeks for the CMYK values, for each color c, that generated the minimum deltaE2K value across all $N_t$ iterations. The selected CMYK values are stored by the program. The fourth block 28 checks whether all colors considered in the algorithm have been already analyzed. If so, the selection algorithm stops. Otherwise, the algorithm continues the process through the counting block 30 for the next color in the list. FIG. 3 shows schematically a set of CMYK values 32 used to select the best CMYK for $N_t$ iterations, and alternately, a second set of CMYK values 34 used to select the best CMYK for $N_t+1$ iterations and a third set of CMYK values 36 used to select the best CMYK for $N_t+2$ iterations.

Figure 4:
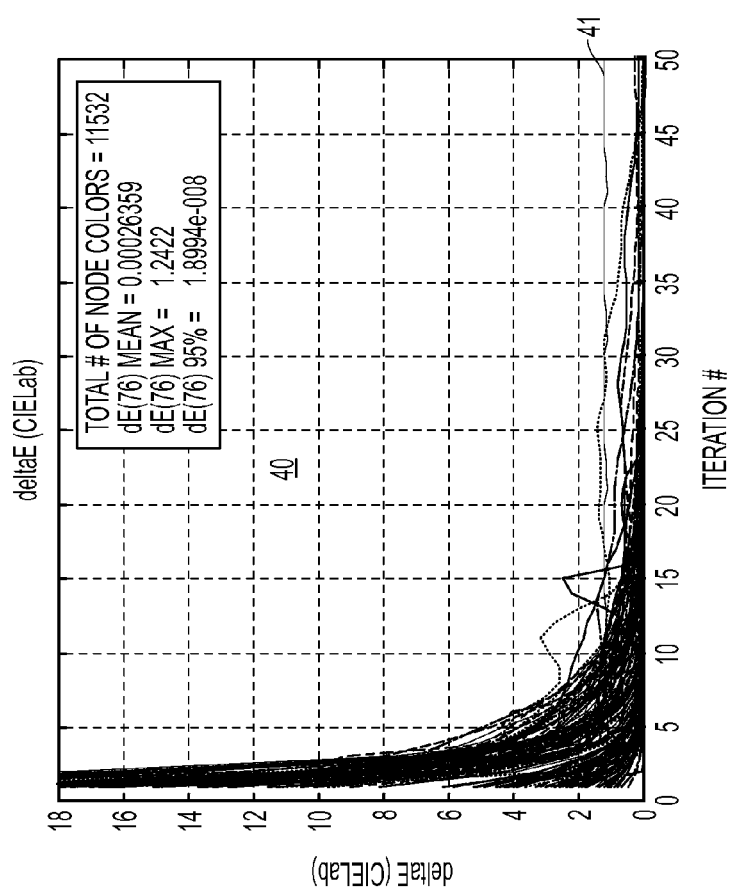
FIG. 4 is a convergence plot after a gain scheduling controller according to concepts of the present application has been implemented.

With reference now to FIG. 4, a convergence plot 40 is shown after the gain scheduling controller has been implemented. Clearly the convergence error has been reduced since the Model-Predictive Control implementation handles difficult nonlinearities present in some areas of the color space. For example, the maximum node error color 41 has a deltaE2K error value, as shown in Table 2, of only 1.24, which is less than the maximum error value of 3.76 shown previously in Table 1.

TABLE 2

| L* | a* | b* | deltaE2K |
|---|---|---|---|
| 22.6534 | 8.0109 | −13.0738 | 0.2051 |
| 28.3485 | 24.1170 | 1.4026 | 0.2839 |
| 18.6336 | 0.8994 | −10.4874 | 1.2422 |

The advantage of using the gain scheduling controller for selected nodes results in both savings in computational time and rendering of accurate colors. The linear controller has the advantages of generating rapid convergence results when compared to the MPC algorithm. Hence, it is advantageous to switch to different controllers for different nodes.

Figure 5:
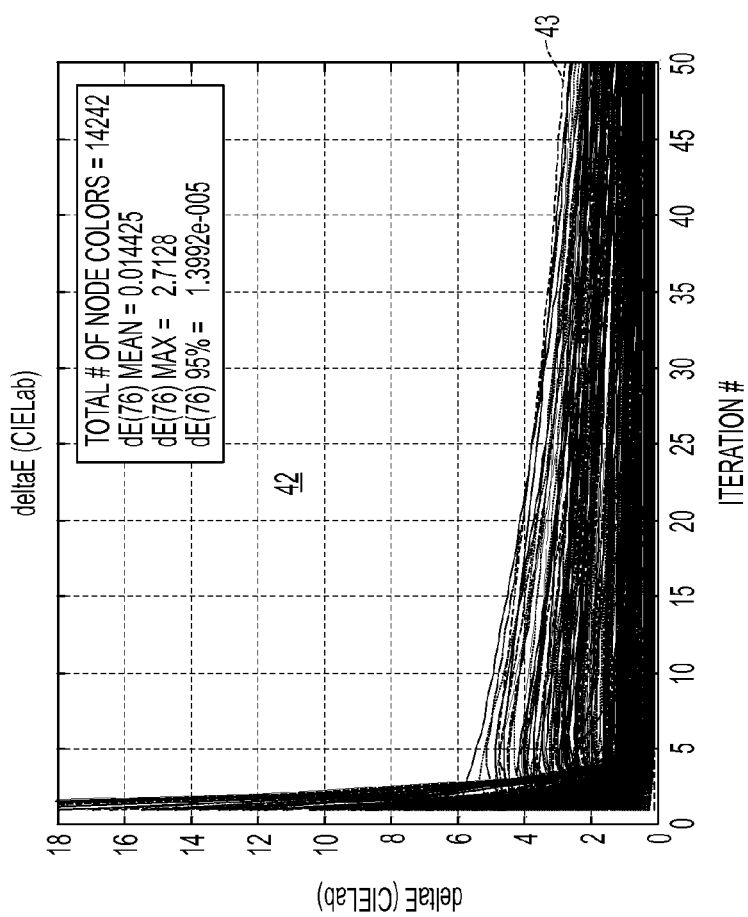
FIG. 5 is a convergence error plot for an exemplary xerographic color printer utilizing a single gain matrix per node color.
Figure 6:
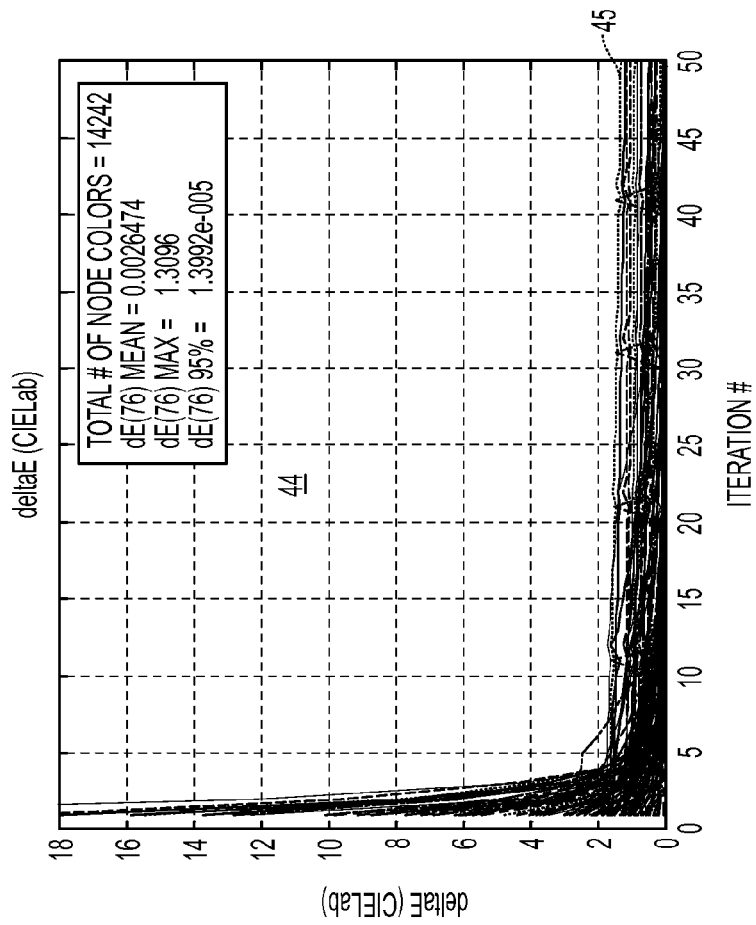
FIG. 6 is a convergence error plot for the exemplary xerographic color used in FIG. 5 utilizing multiple gain matrices per node color according to concepts of the present application.

With reference now to FIGS. 5 and 6, FIG. 5 shows a convergence error plot 42 for an exemplary xerographic color printer utilizing a single gain matrix per node color. The worst-case color 43 has a deltaE2K error value of 2.71. FIG. 6 shows a convergence error plot 44 for the same exemplary xerographic color printer, but this time utilizing multiple gain matrices per node color. The worst-case color 45 in this exemplary case has a reduced deltaE2K error value of only 1.31. Benefits of scheduling gain matrices only for required nodes are clearly visible. Since the colors with convergence problems are near the gamut boundary, the linear controller with a single gain matrix can give unpredictable performance.

Figure 7:
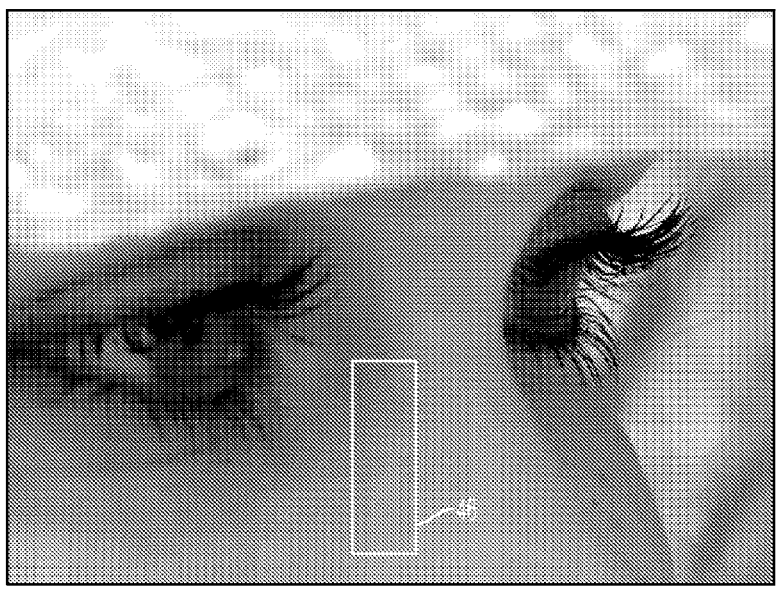
FIG. 7 is a portion of a photographic image is shown where contours can pose a problem.
Figure 8:
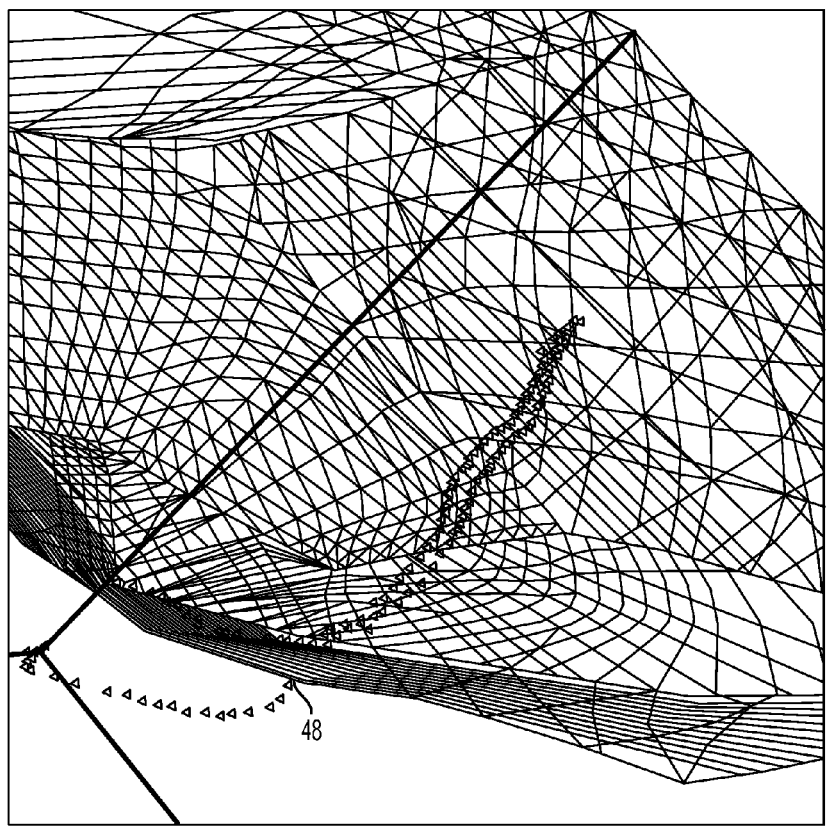
FIG. 8 shows an intersection between mapped gamut colors and in-gamut colors.

Inaccuracies in the in-gamut CMYK values obtained during an inversion process can lead to a non-smooth transition for sweeps going through the boundary. For example, with reference to FIG. 7, a portion of a photographic image is shown where contours can pose a problem. In particular, the boxed-in area 46 is an area of the image where contours can appear in the output image. FIG. 8 further shows an intersection 48 between mapped gamut colors and in-gamut colors.

Figure 9A:
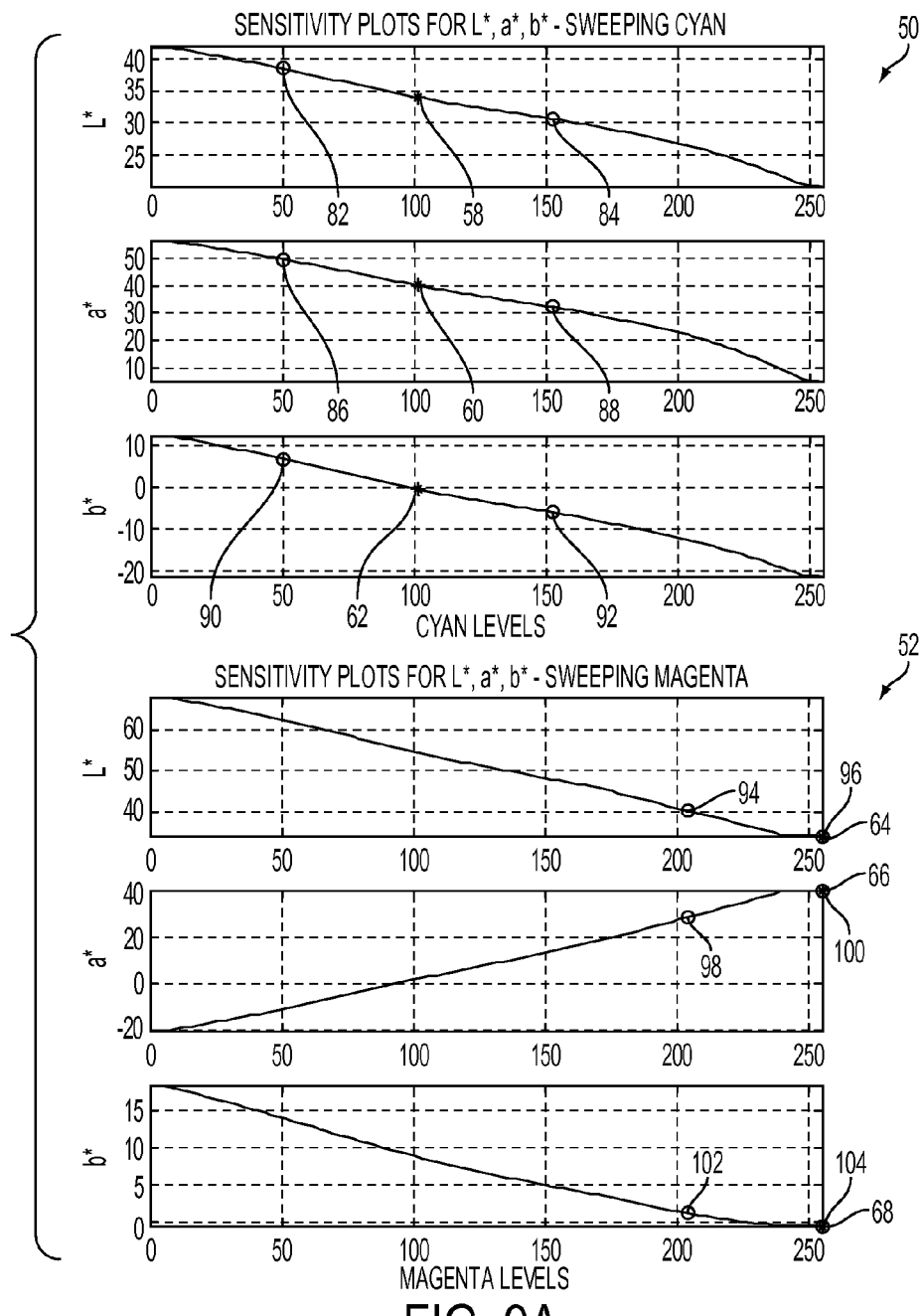
FIG. 9 is sensitivity plots for selected CMYK values.
Figure 9B:
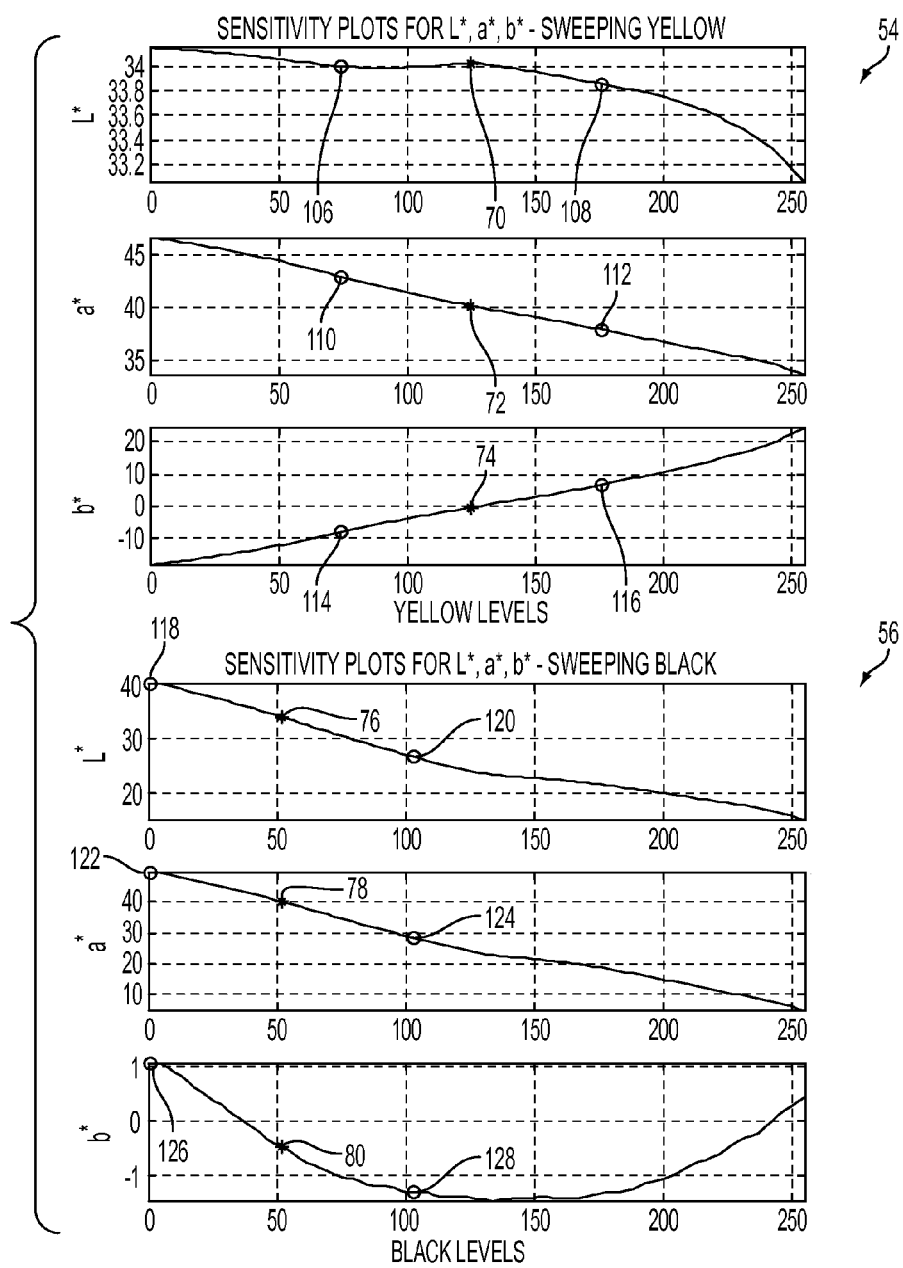

Reasons are now provided describing why the linear controllers do not converge to the desired L*a*b* in some areas of the printer's gamut. As an example, data is provided herein which is associated with the color having the highest delta CIE during 50 iterations. This color has desired L*a*b* values of [32.3 43.4 −0.9] and initial CMYK values of [101.5 255 125.1 51.9]. With reference now to FIG. 9, sensitivity plots 50, 52, 54, 56 are shown for these CMYK values, which result in the following estimated L*a*b* values of [34.0 40.1 −0.55] when a particular printer model is used. Data related to the initial CMYK values are indicated by stars 58-80, whereas the points used by the linear controllers for computing the Jacobian that remains fixed throughout all iterations are represented by circles 82-128. Since the Jacobian is kept fixed, the linear controller can have difficulty converging to the desired L*a*b* values when there is a need to go through nonlinear regions with a change in slope signs. For instance, one may observe peculiarities present for magenta, yellow, and black in some regions of the sensitivity plots 50-56. Notice that although the slopes for most of the plots have an apparent inclination/angle, this is really not the case since the range of the values in the y-axis (vertical axis in the Figure) is very small. Thus, the controller's gain might need to be high in order to reach the target L*a*b* values. The controller's gain is designed by pole values assigned for each color. An aggressive controller is designed by assigning poles located near zero, whereas a conservative controller is designed by assigning poles close to one. Pole values equal to 0.45 are used for the design of linear controllers since this has resulted in good convergence of colors near the boundaries of the gamut. The final L*a*b* values of [33.3 41.47 −0.62] and CMYK values of [74.07 255 100.8 70.45] obtained after 50 iterations of the linear controller result in a delta CIE value of 2.1942.

When the Model-Predictive Control implementation is used with the following parameters: initial CMYK=[101.5 255 125.1 51.9], deltas for Jacobian=0.02, 0.08, 0.14, 0.2; poles=0.15, 0.3667, 0.5833, 0.8; look-ahead=10; number of iterations=5; and the cost function is as described in Equation (2), the final obtained L*a*b* values of [32.3 43.37 −0.91] and CMYK values of [18.1 255 58.6 97.6] result in a delta CIE value of 0.0394.

Figure 10:
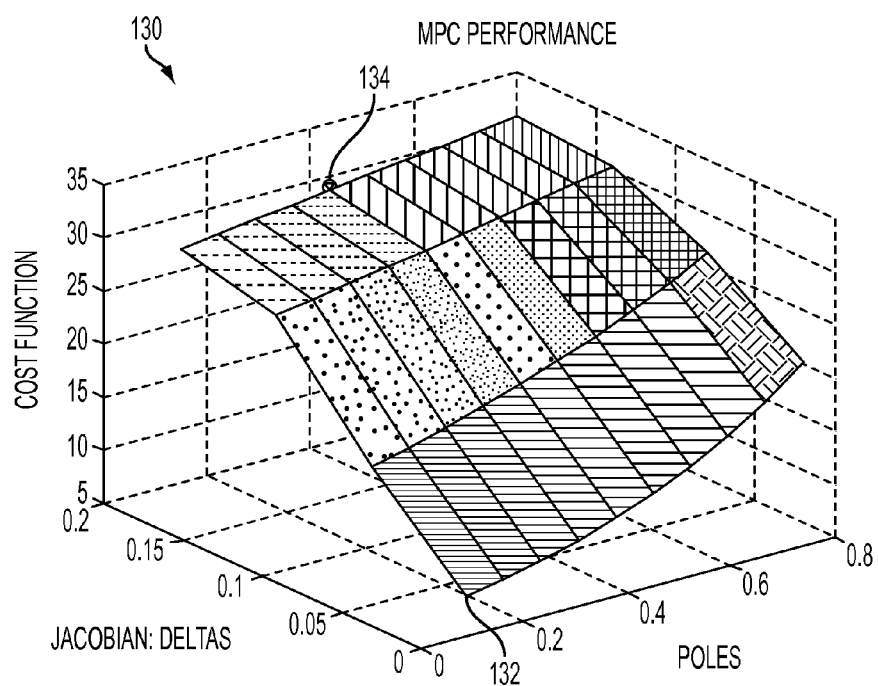
FIG. 10 shows cost function options considered by a Model-Predictive Control process during a first iteration.
Figure 11:
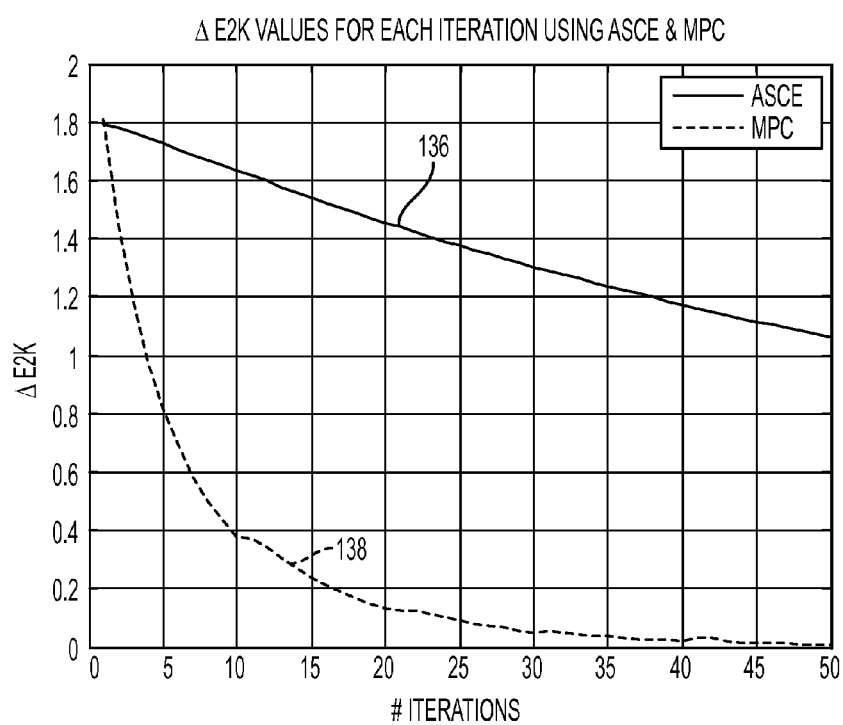
FIG. 11 shows a plot of squared areas of convergence values according to concepts of the present application.

With reference now to FIG. 10, exemplary cost function options 130 considered by the Model-Predictive Control implementation during the first iteration are shown. It is to be appreciated that, while embodiments are described herein with reference to a cost function based on deltaE error values, the present application is not limited in this regard, and other cost function bases known in the art fall within the scope of the present application. The minimum cost function 132 (having the minimum cost) is produced when the controller uses deltas=0.02 and poles=0.15. Notice that the poles selected are demanding of a high gain in order to be able to match the target L*a*b* values, whereas the deltas are small to locally linearize the printer's behavior in that region. In fact, these values were selected for all of the 5 iterations, which indicates that smaller values could have been used for both variables since these are the minimum values selected for the simulation. The cost function values 134 are also shown, encircled by a black dot, for the linear controller. By minimizing the cost function described by Equation (3), the Model-Predictive Control implementation is seeking for a minimum numerical value of the squared area of the convergence values so that the controller is searching for performance values that converge fast with minimal or no oscillations. FIG. 11 shows the area for different controller parameters: the line indicated by numeral 136 shows the performance of the linear controller and the line indicated by numeral 138 shows the performance of the parameters selected by the Model-Predictive Control implementation. Clearly, if Model-Predictive Control is to minimize the area between both performances, then the parameters used for the line indicated by numeral 138 will be selected.

Figure 12:
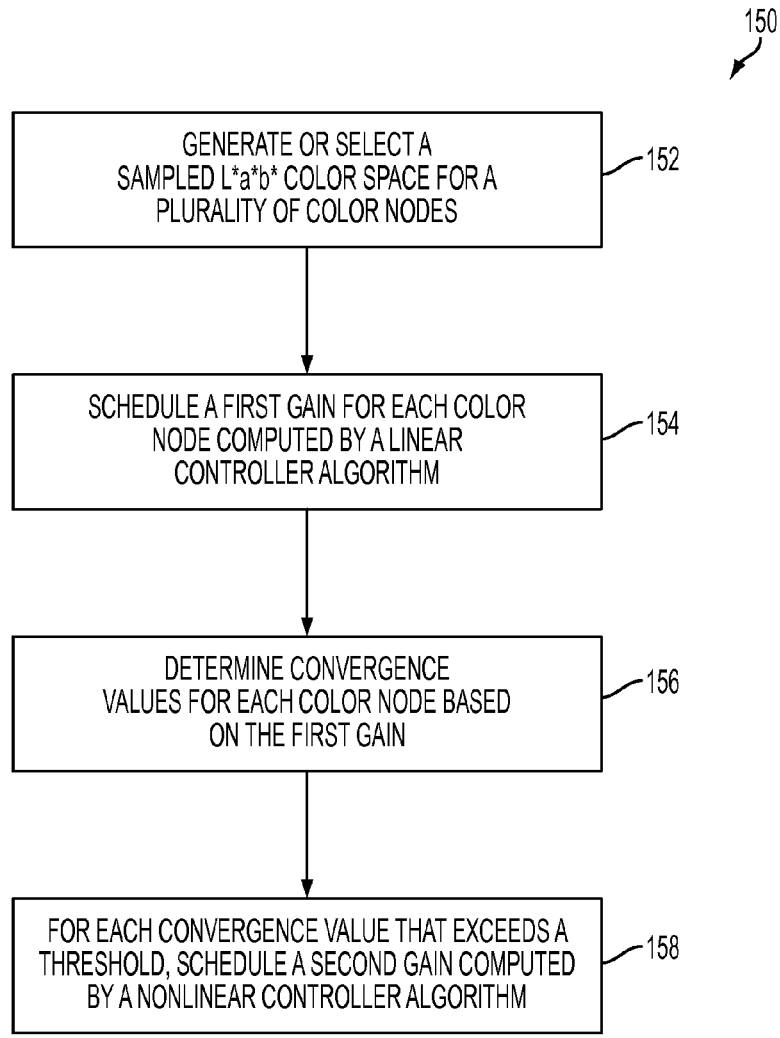
FIG. 12 is a flowchart for a control-based iterative profiling method.

With reference now to FIG. 12, a flowchart for a control-based iterative profiling method is 150 shown. In step 152, a sampled L*a*b* color space is provided or generated, the sampling corresponding to a plurality of L*a*b* color nodes. The sampled L*a*b* color space may be either a uniformly or non-uniformly sampled color space. The sampled L*a*b* color space may be produced by any method known in the art, and the nodes of the color space may represent a mixture of both in-gamut colors and out-of-gamut colors. For example, sampled nodes in RGB node space, or other suitable color node space, may be converted to a sampled L*a*b* color space via a color space transformation such as described, for example, in U.S. patent application Ser. No. 12/127,728. The transformation may further include computing optimal RGB space (or other color space) node values prior to transformation to L*a*b* color space such as described, for example, in U.S. patent application Ser. No. 11/961,367.

A gain scheduling controller is utilized in control-based profiling that is composed of both a linear controller for colors located in linear regions of the device, and a nonlinear controller for colors located in nonlinear regions of the device, e.g., regions bordering out-of-gamut colors. The gain is first scheduled based on the convergence of a linear controller. Thus, in step 154, a linear controller schedules a gain for each color node in the sampled color space. The convergence achieved during iterations performed by the linear controller may be unsatisfactory in nonlinear regions where in-gamut colors are present, as determined at step 156. For nodes in these regions, at step 158, a nonlinear controller, such as described with reference to FIGS. 2-3, is then used to schedule gains for color nodes having unsatisfactory results from the linear controller, i.e., convergence values greater than a pre-defined threshold. Since this method offers improved performance when compared to a single linear controller, it can be used for producing more accurate color management profile lookup tables for printing devices.

Figure 13:
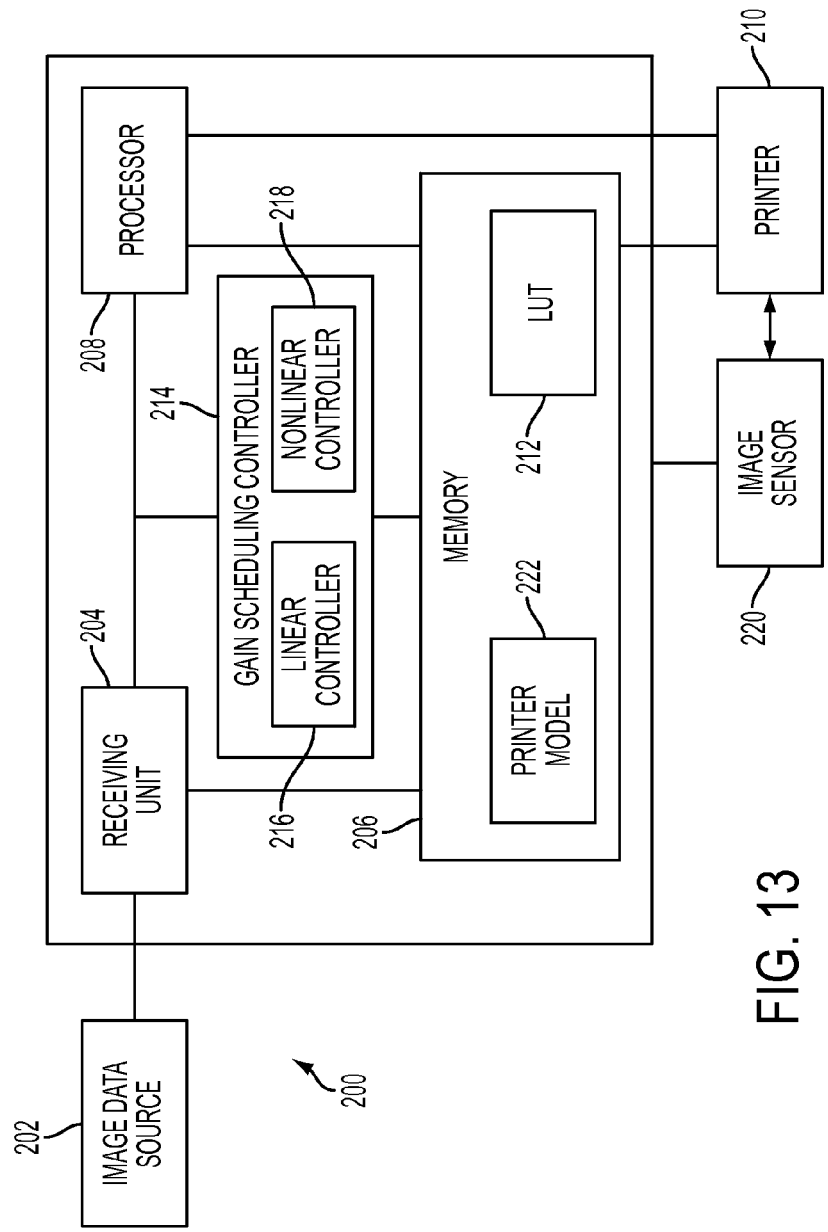
FIG. 13 is a block diagram of one example embodiment of a color printing system in accordance with the iterative profiling of the present application.

With reference now to FIG. 13, there is depicted a functional block diagram of one example embodiment of a color printing system 200 in accordance with the iterative profiling disclosed herein. It is to be understood that certain aspects of the system would operate in accordance with pre-programmed instructions used to operate a local or networked computer system to carry out such features. Such a system may include a computer that can also be associated with a networked storage medium or similar memory device wherein the system is accessible, perhaps via an Internet or intranet for submission of print jobs. It is also contemplated that one or more aspects of the system may be implemented on a dedicated computer workstation. It is to be appreciated that the arrangement shown is only for illustrating one embodiment of the present application.

Images are received from an image data source 202 in either of a device-independent color representation or a device-dependent color representation at a receiving unit 204, stored in a memory 206, which is accessible to a processor 208. The term "image", as used in this disclosure refers to a graphic or plurality of graphics, compilation of text, a contone or halftone pictorial image, or any combination or sub-combination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image (where the image is representative of a physical object). A special subclass of images is associated with complete documents, which are hereinafter referred to as "document images". Thus an image may be a document image assembled by a customer at the image data source 202, one or more elements of a document image, a "test patch" generated by printing application software or another type of control system, or a member of a collection of images in a database. Image data source 202 provides image data that, when used to display the image or convert the image into a hard copy, provides an approximate representation of the image. The image data source 202 provides the image data to the receiving unit 204.

The memory 206 may include, e.g., read only memory (ROM), random access memory (RAM), and/or memory with other access options. The received images are mapped through a multidimensional LUT transformation by the processor 208 to produce a device dependent representation that is sent to the printer 210 for outputting a hardcopy of the image (for example one that represents an image of a physical object). The processor 208 retrieves the multidimensional LUT 212 from the memory 206 for performing the multidimensional LUT transformation. Derivation of the LUT node values is carried out by a gain scheduling controller 214, which itself includes a linear controller 216 and a nonlinear controller 218, according to the techniques described in this disclosure.

The printer 210, may be any type of image marking device or hard copy output device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The printer 210 generates the hard copy of the image based on printable image data generated by via the multidimensional LUT 212.

An image sensor 220 may be provided for obtaining L*a*b* measurements as previously described. The image sensor 220 may be any type of device that is capable of detecting image data from a hard copy image and supplying the image data as detected device-independent image data or device dependent image data or post-processed image data, which may be in device-independent or in device-dependent form to the printing system 200. For example, the image sensor may be an optical sensor, a spectrophotometer, a color sensor, an inline sensor, an off-line sensor, or any other known or later developed device or system that is able to measure the color values of the image data from the hard copy image output by the printer 210.

A printer model 222 is also provided for use by the linear controller 216 when computing the printer Jacobian as described previously. Although the printer model 222 is shown in the memory 206 where it is stored for use by the linear controller 216 or other elements of the printing system 200, it is to be appreciated that the printer model may be received as input to the system, e.g., via image data source 202, or may be permanently stored elsewhere in the printing system 200.

Although, for the purposes of description, elements of the printing system 200 are shown as part of an integrated, single device such as a digital copier, a computer with a built-in printer or any other integrated device that is capable of producing a hard copy image output, the elements shown may be separate devices operating in cooperation with each other. For example, the gain scheduling controller 214 may be incorporated into a network print server that manages printer data for a plurality of the same or different printing devices. Furthermore, the gain scheduling controller 214 may be implemented as software on the image data source 202 or the printer 210. The image sensor 220 may be incorporated into the printer 210 or may exist as a standalone device that communicates the detected data back to the image data source 202. Other configurations of the elements shown in FIG. 13 may be utilized without departing from the spirit and scope of the specification and claims herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of color management for an image marking device, the method comprising:
    scheduling a first gain for each of a plurality of color nodes of a sampled color space, each gain computed based on a model of the image marking device;
    for each node of the plurality of color nodes for which a convergence error exceeds a threshold, scheduling a second gain, the scheduling a second gain comprising:
        initializing operational parameters, the operational parameters including a desired performance criteria to be minimized through selection of at least one of a plurality of gain matrices to identify a plurality of new CMYK values; and
        performing an iterative procedure comprising, for each iteration:
            computing the plurality of gain matrices over a defined projection horizon;
            evaluating a cost function, having constants to control a color difference value and a control energy for a plurality of actuators used to track the color difference value, for each of the plurality of gain matrices, wherein the cost function assesses at least one member selected from a group consisting of the color difference value, the control energy of the actuators used to track the color difference value, or a balance between the color difference value and the control energy of the actuators;
            scheduling a new gain based on selecting a gain matrix from the plurality of gain matrices that results in a minimum value of the cost function; and
            computing the new CMYK values based on the new gain; and
    storing in a memory, a multidimensional LUT based on the scheduled gain matrices; and
    generating a hardcopy output image based on the stored multidimensional LUT.

2. The method of claim 1, wherein the sampled color space comprises at least one of a uniformly sampled color space and a non-uniformly sampled color space.

3. The method of claim 1, wherein the sampled color space comprises a sampled L*a*b* color space and the plurality of color nodes comprises a plurality of L*a*b* color nodes.

4. The method of claim 1, wherein the performing an iterative procedure further comprises determining the minimum value of the cost function, and wherein the cost function is based on at least one of a deltaE error value and a deltaE2K error value.

5. The method of claim 1, wherein computing new CMYK values includes generating a printable document of at least one sample patch for the plurality of color nodes.

6. The method of claim 5, further comprising analyzing the color composition of the at least one sample patch with a color sensing device to develop L*a*b* data, and transmitting the L*a*b* data from the color sensing device to at least one of a linear controller and a nonlinear controller, wherein the first gain is computed by the linear controller and the second gain is computed by the nonlinear controller.

7. The method of claim 1, wherein the projection horizon comprises a number of iterations planned for each gain matrix within said plurality of gain matrices.

8. A system of color management for an image marking device, comprising:
    a receiving unit for receiving image data input for a marking job, wherein the image data input may be in either a device-dependent or a device-independent color space;
    a memory for storing a multidimensional LUT;
    a gain scheduling controller including a linear controller and a nonlinear controller, wherein the gain scheduling controller is configured to perform a method of color management, the method comprising:
        scheduling a first gain for each of a plurality of color nodes of a sampled color space, each gain computed based on a model of the image marking device;
        for each node of the plurality of color nodes for which a convergence error exceeds a threshold, scheduling a second gain, the scheduling a second gain comprising:
            initializing operational parameters, the operational parameters including a desired performance criteria to be minimized through selection of at least one of a plurality of possible gain matrices to identify a plurality of new CMYK values; and
            performing an iterative procedure comprising, for each iteration:
                computing the plurality of gain matrices over a defined projection horizon;
                evaluating a cost function having constants to control a color difference value and a control energy for a plurality of actuators used to track the color difference value, for each of the plurality of gain matrices, wherein the cost function assesses at least one member selected from a group consisting of the color difference value, the control energy of the actuators used to track the color difference value, or a balance between the color difference value and the control energy of the actuators;
                scheduling a new gain based on selecting a gain matrix from the plurality of gain matrices that results in a minimum value of the cost function; and
                computing the new CMYK values based on the new gain; and
        storing in a memory, a multidimensional LUT based on the scheduled gain matrices; and
        generating a hardcopy output image based on the stored multidimensional LUT.

9. The system of claim 8, wherein the sampled color space comprises at least one of a uniformly sampled color space and a non-uniformly sampled color space.

10. The system of claim 8, wherein the sampled color space comprises a sampled L*a*b* color space and the plurality of color nodes comprises a plurality of L*a*b* color nodes.

11. The system of claim 8, wherein the performing an iterative procedure further comprises determining a minimum value of the cost function, and wherein the cost function is based on at least one of a deltaE error value and a deltaE2K error value.

12. The system of claim 8, wherein computing new CMYK values includes generating a printable document of at least one sample patch for the plurality of color nodes.

13. The system of claim 12, further comprising a color sensing device, wherein the method of color management further comprises analyzing the color composition of the at least one sample patch with a color sensing device to develop L*a*b* data, and transmitting the L*a*b* data from the color sensing device to at least one of the linear controller and the nonlinear controller, wherein the first gain is computed by the linear controller and the second gain is computed by the nonlinear controller.

14. The system of claim 8, wherein the projection horizon comprises a number of iterations planned for each gain matrix within said plurality of gain matrices.

15. A non-transitory computer-readable storage medium having computer readable program code embodied in said medium which, when said program code is executed by a computer causes said computer to perform method steps for color management of an image marking device, the method comprising:

scheduling a first gain for each of a plurality of color nodes of a sampled color space, each gain computed based on a model of the image marking device;

for each node of the plurality of color nodes for which a convergence error exceeds a threshold, scheduling a second gain, the scheduling a second gain comprising:

initializing operational parameters, the operational parameters including a desired performance criteria to be minimized through selection of at least one of a plurality of possible gain matrices to identify a plurality of new CMYK values; and performing an iterative procedure comprising, for each iteration:

computing the plurality of gain matrices over a defined projection horizon;

evaluating a cost function, having constants to scale a color difference value and a control energy for a plurality of actuators used to track the color difference value, for each of the plurality of gain matrices, wherein the cost function assesses at least one member selected from a group consisting of the color difference value[s], the control energy of the actuators used to track the color difference value, or a balance between the color difference value[s] and the control energy of the actuators;

scheduling a new gain based on selecting a gain matrix from the plurality of gain matrices that results in a minimum value of the cost function; and computing the new CMYK values based on the new gain; and storing in a memory, a multidimensional LUT based on the scheduled gain matrices; and generating a hardcopy output image based on the stored multidimensional LUT.

16. The computer-readable storage medium of claim 15, wherein the sampled color space comprises at least one of a uniformly sampled L*a*b* color space and a non-uniformly sampled L*a*b* color space, and the plurality of color nodes comprises a plurality of L*a*b* color nodes.

17. The computer-readable storage medium of claim 15, wherein the performing an iterative procedure further comprises determining the minimum value of the cost function, and wherein the cost function is based on at least one of a deltaE error value and a deltaE2K error value.

18. The computer-readable storage medium of claim 15, wherein computing new CMYK values includes generating a printable document of at least one sample patch for the plurality of color nodes.

19. The computer-readable storage medium of claim 18, further comprising analyzing the color composition of the at least one sample patch with a color sensing device to develop L*a*b* data, and transmitting the L*a*b* data from the color sensing device to at least one of a linear controller and a nonlinear controller, wherein the first gain is computed by the linear controller and the second gain is computed by the nonlinear controller.

20. The computer-readable storage medium of claim 15, wherein the projection horizon comprises a number of iterations planned for each gain matrix within said plurality of gain matrices.

* * * * *